Jan. 29, 1935.  B. BURNS  1,989,266
FUSELAGE WELDER
Filed Aug. 18, 1933  3 Sheets-Sheet 1
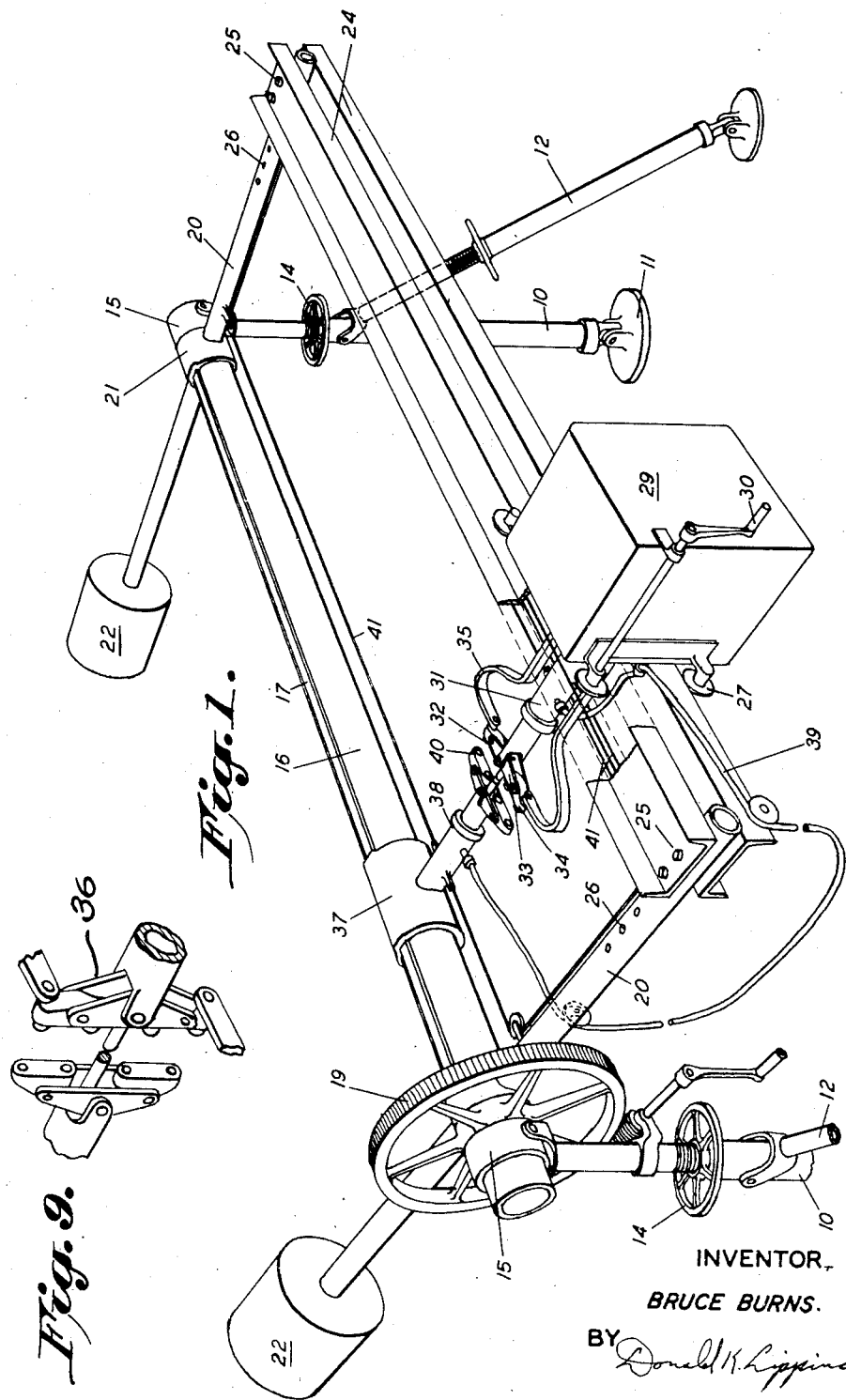
INVENTOR,
BRUCE BURNS.
BY
ATTORNEY.

Jan. 29, 1935.                B. BURNS                 1,989,266
                           FUSELAGE WELDER
                        Filed Aug. 18, 1933     3 Sheets-Sheet 2
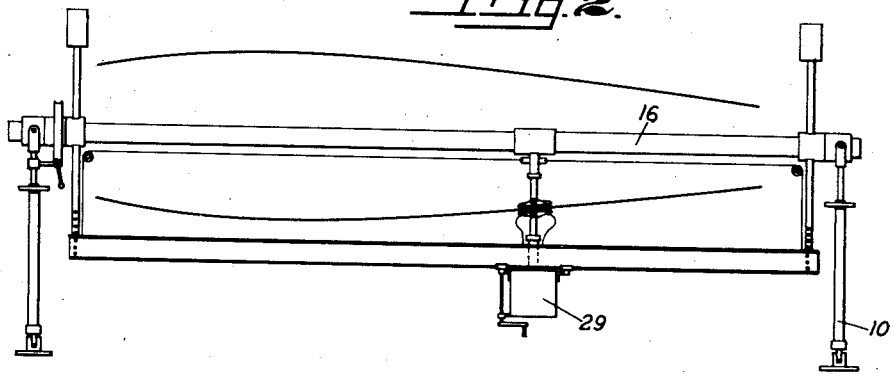
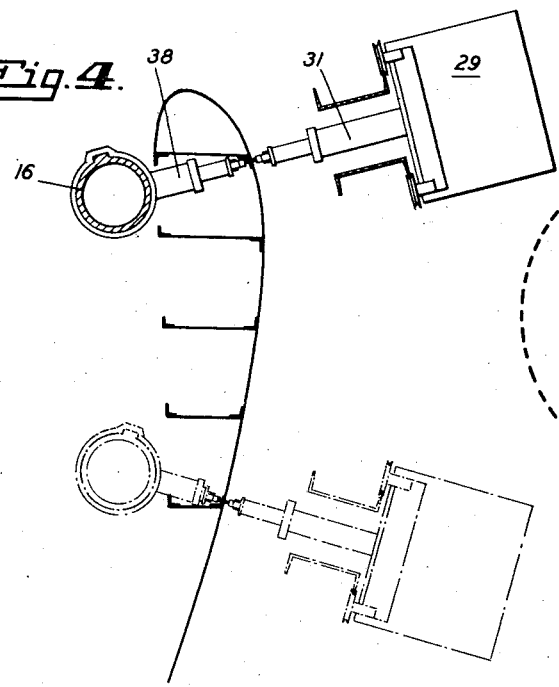
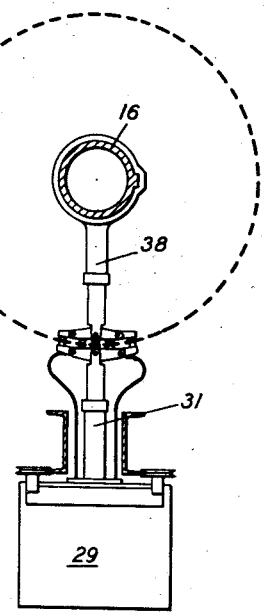
INVENTOR,
BRUCE BURNS.
BY
ATTORNEY.

Jan. 29, 1935.　　　　B. BURNS　　　　1,989,266

FUSELAGE WELDER

Filed Aug. 18, 1933　　　3 Sheets-Sheet 3

INVENTOR,
BRUCE BURNS.
BY
ATTORNEY.

Patented Jan. 29, 1935

1,989,266

UNITED STATES PATENT OFFICE 1,989,266

FUSELAGE WELDER

Bruce Burns, Santa Monica, Calif., assignor to The Northrop Corporation, Inglewood, Calif., a corporation of California Application August 18, 1933, Serial No. 685,735

21 Claims. (Cl. 219—4)

My invention relates to a device for welding hollow members, and more particularly to a welder adapted to fabricate an airplane fuselage, and other hollow members entering into aircraft structure.

Among the objects of my invention are: To provide a device to be used in the fabrication of hollow airplane members by spot welding; to provide an airplane fuselage welder; to provide a device for welding hollow members of varying contour; to provide a spot welder adapted to weld longitudinal or peripheral seams in a hollow member; to provide means for applying pressure to opposed welding contacts; to provide a spot welding device for hollow members in which the pressure of the welding contacts is hydraulically regulated; to provide a welding contact applicator having a variable speed of approach to the work; to provide a hydraulically operated welding contact applicator and means for mounting said applicator to fabricate hollow members; to provide means for fabricating metal airplane parts by a spot welding process; and to provide a spot welder for hollow bodies of varying diameter.

Other objects of my invention will be apparent or will be specifically pointed out in the description forming a part of this specification, but I do not limit myself to the embodiment of my invention herein described, as various forms may be adopted within the scope of the claims.

Referring to the drawings which depict a preferred form of my invention:

Figure 1 is a perspective view of my invention as adapted for the spot welding of an airplane fuselage.

Figure 2 is a schematic side view showing the fuselage in place.

Figure 3 is a cross sectional view partly in elevation showing the opposed relation of the welding contacts.

Figure 4 is a diagrammatic sectional view showing the device as used to weld wing members.

Figure 9 is a perspective view of the contact heads.

Figure 5:
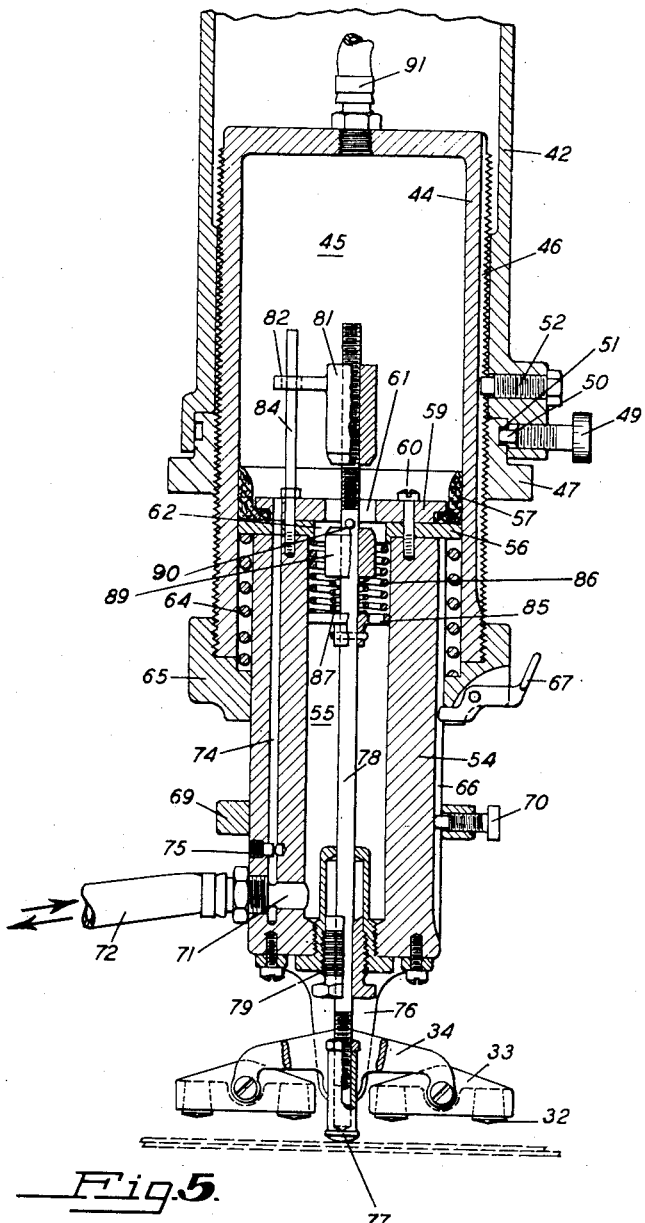
Figure 5 is a sectional view of a hydraulically operated variable speed welding contact applicator.

In broad terms my invention comprises a pair of opposed welding contact applicators, one inside the hollow member to be welded, the other outside. Hydraulic means are preferably provided to cause the wall of the hollow member to be clamped between the contacts when the weld occurs, and also to retract the contacts from the wall when the weld is finished. It is desirable to vary the speed of approach of the welding contacts to the work, that is, to have the final pressure applied slowly, while the contacts leave and approach the work with relatively high speed. A valve is associated with the contact applicator operated by contact with the work ahead of the welding contacts to regulate the application of the hydraulic pressure. It may also be desirable to operate plain applicators from the controlled pressure of a single differential motion applicator, whereby the plain applicators will duplicate the motion of the original applicator without necessity of duplicating the valve mechanism.

In the drawings, referring directly to Figures 1 and 2, a pair of uprights 10—10 are fastened to the floor or other foundation by a base-plate 11 hinged to the uprights, the angle being regulated by a threaded angle bar 12. The uprights are extensible as to height by turning a hand wheel 14. Guide bearings 15 yoked to the top of the uprights carry between them an internal guide 16, provided with a key ridge 17, and rotatable in the bearings by a worm gear 19.

End struts 20 are mounted on end slides 21, and extend laterally in one direction to carry counter weights 22 and in the opposite direction to carry an external guide 24 comprising two channels placed back-to-back on each side of the struts, and maintained in place by lateral bolts 25 which pass through certain of a series of holes 26 in the ends of the struts. The distance between the guides 16 and 24 may be changed by the proper choice of these holes.

Mounted on the external guide 24 by means of rollers 27 is a transformer casing 29, one of the rollers being provided with a crank 30 for convenience in moving the casing along the guide.

Extended from the casing 29, between the U-beams is an outer hydraulic welding contact applicator 31, preferably of the type to be later described, carrying on its end a series of welding contacts 32, preferably four in number, two on a contact yoke 33, the two contact yokes bridged by a cross yoke 34 hinged to the end of the applicator. The outer contacts are connected to a welding transformer inside of the casing 29 by flexible ribbons 35, and the contacts may be rotated into a vertical position as shown in the diagram 36, Figure 9.

An internal slide 37 carries an internal welding contact applicator 30 extending toward the outer contact applicator 31 and carrying four backing contacts 40 also mounted on yokes as described previously for the welding contacts. The backing contacts are positioned to oppose the welding contacts with the work between as shown in Figures 2 and 3, and the internal welding contact may be either a differential motion applicator or a plain applicator as will be later disclosed.

A hydraulic hose 39 connects the two applicators and is connected to a source of hydraulic pressure, not shown.

When the contacts are set as above described, the welding and backing contacts will form, when presented to the work, and the end welding contacts energized by a welding transformer, a series weld as described in my previous application, Serial No. 675,396 filed June 12, 1933 for Welding method and apparatus. It is obvious, however, that the present invention may use other methods and means for performing the actual weld, the series weld being preferable on the score of speed.

Cables 41 interconnect the casing 29 with the internal slide 37 so that both the casing and the slide may move along the guides together to maintain the relative position of the internal and external contacts at all times.

If a fuselage be placed around the internal guide it may thus be seen that all portions of its surface may be reached by the welding contacts, the contacts being capable of being rotated completely around the fuselage and of progressing the length of the hollow member. In addition the yoked contacts allow the varying contour of the fuselage to be compensated for, as shown in Figures 2 and 3.

Figure 4 illustrates the use of the device for fabrication of wings by the spot welding method, no changes being necessary in the structure other than to utilize the various adjustments.

I prefer to utilize a special type of hydraulic applicator, preferably the one shown in Figure 5. In Figure 2 it will be noticed that the fuselage is wider at one end than the other, and the relative distance of extension of the contacts will differ between the inner and outer applicators at the two ends of the fuselage. I have therefore provided an applicator which will automatically extend until near the work and then apply the welding pressure.

In this electrode applicator, a sleeve 42 is provided which may attach to the internal slide 37 or the casing 29 on the external guide. Fitting the sleeve, but not threaded thereto is a hydraulic cylinder 44 having an interior cylinder cavity 45, the cylinder being threaded on the outside over substantially its entire length, and provided with a number of spline grooves 46. A cylinder nut 47 is threaded on the cylinder and the cylinder is maintained within the sleeve by one or more lock screws 49 having a dowel end 50 fitting a circumferential groove 51 in the nut. Rotation of the nut will provide means for extending or retracting the cylinder within the sleeve, the cylinder itself, being prevented from rotation by a spline pin 52 extending into one of the spline grooves 46.

A piston 54 having an interior cavity 55 and a top plate 56 is provided with a cup leather 57 held in place by a clamp plate 59, screws 60 binding the two plates and the cup leather to the piston end. A valve aperture 61 is bored in the clamp plate, a slightly larger top plate hole 62 allowing free passageway through the piston top. The piston diameter is slightly smaller than that of the cylinder bore, and the top plate extends the full diameter, thus forming a shoulder against which a piston retractor spring 64 may bear. This spring is held against the shoulder by a piston guide nut 65. The piston spring therefore tends to hold the piston in the cylinder. It is preferable to form several longitudinal grooves 66 in the piston, the orientation being controlled by a rotation lock 67 entering one of the splines.

A movable stop shoulder 69 is placed around the piston having a piston stop screw 70 also engaging one of the splines, to regulate the degree of piston retraction.

Near the outer end of the piston a hydraulic inlet bore 71 is provided, connecting a hydraulic supply hose 72 with the piston cavity. A by-pass bore 74 extends from this inlet bore through the wall of the piston, the top plate and the clamp plate to open in the cylinder space 45 above the piston. A by-pass valve 75 regulates the amount of fluid passing along the by-pass bore.

The extreme outer end of the piston is provided with an electrode bracket 76 extending outwardly and carrying the contacts, backing or welding as previously described.

Between the two contact yokes 33 passes a valve tip 77 screwed to an operating rod 78 extending through a stuffing box 79 in the outer end of the piston, through the piston cavity and through the valve aperture 61 into the cylinder cavity. An upper valve body 81 is threaded on the end of the operating rod above the valve aperture 61 and is held in place by an arm 82 bored to slide along a valve guide 84 inserted in the head of the piston.

An apertured operating rod slide 85 is pinned to the rod in the piston cavity and holds an operating rod spring 86 against the top plate 56. A valve spring 87 also bears against this slide holding a lower valve body 89 against a retaining pin 90. This lower valve body is in the piston cavity.

Separate communication to the cylinder cavity is provided by means of hose connection 91 on the top of the cylinder.

Figure 6:
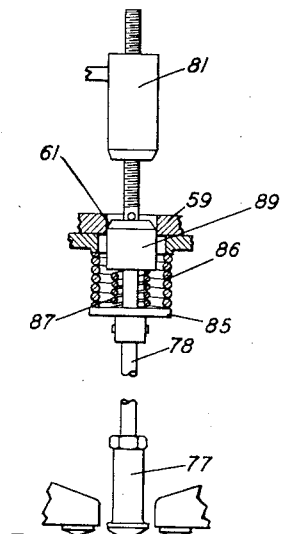
Figure 6 is a view showing the valve relationship at the time of welding.
Figure 7:
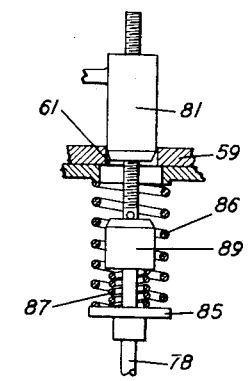
Figure 7 is a view showing the valve relationship when the welding contacts are withdrawn from the work.

In operation, referring to the steps shown in Figures 5, 6 and 7, when it is desired to retract the electrodes from the work to move to another position, the hydraulic supply hose 72 is vented to atmosphere or connected to a suction source and the piston retractor spring forces the piston and electrode assembly away from the work.

The piston retractor spring is of such character that the pressure which it builds up in the cylinder cavity 45 is sufficient to push the lower valve body 89 out of the valve aperture 61 against the resistance of the valve spring 87. Free flow of fluid from the cylinder cavity 45 thus permits the piston to retract at a rapid rate until the operating mechanism assumes the position shown in Figure 7. In this figure the upper valve 81 has just sealed the valve aperture 61, and further fluid flow must occur only through the by-pass 75.

If operating pressure is not now re-applied through the supply hose 72, the piston retractor spring will slowly force the piston into the cylinder until the stop shoulder 69 bears against the end of the piston guide nut 65. This stop shoulder 69 will be ordinarily so adjusted that it will meet the nut 65 as soon as the valve tip 77 has cleared the work a fraction of an inch, so that although there may be some delay in re-application of operating pressure the electrodes will not be a great distance from the work and little time will be lost in bringing them into contact again.

It will thus be observed that although the electrodes, through the operation of the mechanism as described, approach the work at first rapidly and then slowly, when it is desired to retract them they start away rapidly due to the opening of the lower valve body 89.

When work of uniform diameter is to be welded and the type of differential motion applicator as described above is used on the casing, a plain type of applicator piston may be used on the internal guide, by supplying the fluid for the plain applicator from the hose connection 91 which leads from the top of the cylinder cavity. As the liquid transfer is controlled before it reaches this cavity, the plain piston will be subjected to the same operating pressures as the differential applicator, and whether it reaches the work before or after the latter is not important, since neither piston can exert appreciable pressure upon the work until they are opposed to each other in contact. When, however, a fuselage as shown in Figure 2 is to be welded, differential motion applicators are preferably used both in and out. When hydraulic pressure is applied, each piston will advance until the tip 77 hits the work, and then proceed slowly, irrespective of the different distance each has to travel, although it is preferable to adjust roughly by means of the nut 47 or the stop shoulder 69 so that the difference in distance of travel of the two pistons is not too great.

Figure 8:
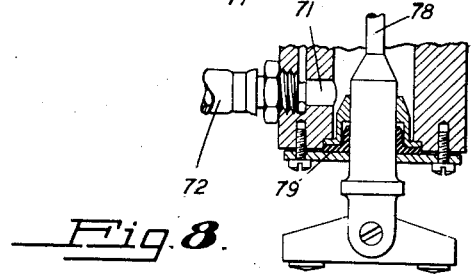
Figure 8 is a sectional view of a differential welding applicator having contacts mounted on the valve-actuating rod.

In Figure 8 the lower end of the operating rod has been enlarged for structural reasons, the construction of the packing arrangement has been changed and a single pair of bridging electrodes has been mounted for purposes of illustration upon the end of the rod. The rest of the structure remains as in Figure 5.

Upon application of operating pressure to this structure, the piston will move rapidly toward the work until the electrodes themselves make contact and cause the operating rod to close the lower valve, when the piston will move slowly until the plate on its end engages the shoulder on the enlarged portion of the operating rod and forces the electrodes against the work with full pressure.

The retracting cycle will be similar to the one described above, except that the electrodes themselves now serve the same function as did the valve tip 77.

It should be noted that a non-parallel relationship of the internal guide 16 and the external guide 24 may be obtained by the proper choice of holes 26 in the end struts 20. On certain types of work, such as the welding of longitudinal seams near the tail of a fuselage, it may be desirable to set the guides in such a non-parallel relationship. This will permit progression from one spot to another through a considerable distance with less necessity for changing the settings of the stop shoulders. Such adjustment may be adopted within the scope of the claims.

I claim:

1. A device for welding hollow members comprising an internal guide adapted to pass through said member, an external guide adjacent to said internal guide, a casing slidably mounted on said external guide, a pair of welding electrodes mounted on said casing, a pair of backing electrodes slidably mounted on said internal guide, means for extending said pairs of electrodes toward each other to clamp the wall of said member therebetween, and means for energizing said welding electrodes.

2. A device for welding hollow members comprising an internal guide adapted to pass through said member, an external guide adjacent to said internal guide, a casing slidably mounted on said external guide, a pair of welding electrodes mounted on said casing, a pair of backing electrodes slidably mounted on said internal guide, means for extending said pairs of electrodes toward each other to clamp the wall of said member therebetween, and a transformer within said casing for supplying low voltage current to said welding electrodes.

3. A device for welding hollow members comprising an internal guide adapted to pass through said member, an external guide adjacent to said internal guide, a casing slidably mounted on said external guide, a pair of welding electrodes mounted on said casing, a pair of backing electrodes slidably mounted on said internal guide, means for extending said pairs of electrodes toward each other to clamp the wall of said member therebetween, means for energizing said welding electrodes, and means interconnecting said casing and said backing electrodes whereby said casing and backing electrodes will maintain their opposing relationship when slid along said guides.

4. A device for welding hollow members comprising an internal guide adapted to pass through said member, an external guide adjacent to said internal guide, a casing slidably mounted on said external guide, a pair of welding electrodes mounted on said casing, a pair of backing electrodes slidably mounted on said internal guide, hydraulic means for extending said pairs of electrodes toward each other to clamp the wall of said member therebetween, and means for energizing said welding electrodes.

5. A device for welding hollow members comprising an internal guide adapted to pass through said member, an external guide, means for maintaining said external guide approximately parallel to said internal guide at varying distances therefrom, a casing slidably mounted on said external guide, a pair of welding electrodes mounted on said casing, a pair of backing electrodes slidably mounted on said internal guide, means for extending said pairs of electrodes toward each other to clamp the wall of said member therebetween, and means for energizing said welding electrodes.

6. A device for welding hollow members comprising an internal guide adapted to pass through said member, an external guide, means attached to said internal guide for maintaining said external guide approximately parallel to said internal guide at varying distances therefrom, means for supporting said internal guide, a casing slidably mounted on said external guide, a pair of welding electrodes mounted on said casing, a pair of backing electrodes slidably mounted on said internal guide, means for extending said pairs of electrodes toward each other to clamp the wall of said member therebetween, and means for energizing said welding electrodes.

7. A device for welding hollow members comprising an internal guide adapted to pass through said member, an external guide, means attached to said internal guide for maintaining said external guide approximately parallel to said internal guide at varying distances therefrom, means for supporting said internal guide, means for rotating said internal guide, a casing slidably mounted on said external guide, a pair of welding electrodes mounted on said casing, a pair of backing electrodes slidably mounted on said internal guide, means for extending said pairs of electrodes toward each other to clamp the wall of said member therebetween, and means for energizing said welding electrodes.

8. A device for welding hollow members comprising an internal guide adapted to pass through said member, an external guide fixed in an approximately parallel relation to said internal guide, a casing slidably mounted on said external guide, a hydraulic cylinder mounted on said casing, a piston extended toward said internal guide from said cylinder, a pair of welding electrodes mounted on the outer end of said piston, a welding transformer mounted within said casing, leads from said transformer to said welding electrodes, a hydraulic backing cylinder slidably mounted on said internal guide, a backing piston extended from said backing cylinder toward said external guide, a pair of backing contacts mounted on the outer end of said piston, said contacts being interconnected and having the same spacing as said welding contacts, said backing contacts being positioned to be opposite said welding contacts on the other side of the wall of said member when said pistons are extended, and means for extending said pistons to clamp the wall between said electrodes.

9. A device for welding hollow members comprising an internal guide adapted to pass through said member, an external guide fixed in an approximately parallel relation to said internal guide, a casing slidably mounted on said external guide, a hydraulic cylinder mounted on said casing, a piston extended toward said internal guide from said cylinder, a pair of welding electrodes mounted on the outer end of said piston, a welding transformer mounted within said casing, leads from said transformer to said welding electrodes, a hydraulic backing cylinder slidably mounted on said internal guide, a backing piston extended from said backing cylinder toward said external guide, a pair of backing contacts mounted on the outer end of said piston, said contacts being interconnected and having the same spacing as said welding contacts, said backing contacts being positioned to be opposite said welding contacts on the other side of the wall of said member when said pistons are extended, and means for supplying hydraulic pressure to said cylinders to cause said pistons to extend to clamp the wall between the welding and backing electrodes.

10. A device for welding hollow members comprising an internal guide adapted to pass through said member, an external guide fixed in an approximately parallel relation to said internal guide, a casing slidably mounted on said external guide, a hydraulic cylinder mounted on said casing, a piston extended toward said internal guide from said cylinder, a pair of welding electrodes mounted on the outer end of said piston, a welding transformer mounted within said casing, leads from said transformer to said welding electrodes, a hydraulic backing cylinder slidably mounted on said internal guide, a backing piston extended from said backing cylinder toward said external guide, a pair of backing contacts mounted on the outer end of said piston, said contacts being interconnected and having the same spacing as said welding contacts, said backing contacts being positioned to be opposite said welding contacts on the other side of the wall of said member when said pistons are extended, means for extending said pistons to clamp the wall between the welding and backing electrodes, and means for sliding said casing and said backing cylinder along said guides in opposing relationship.

11. A device for welding hollow members comprising an internal guide adapted to pass through said member, an external guide fixed in an approximately parallel relation to said internal guide, a casing slidably mounted on said external guide, a hydraulic cylinder mounted on said casing, a piston extended toward said internal guide from said cylinder, a pair of welding electrodes mounted on the outer end of said piston, a welding transformer mounted within said casing, leads from said transformer to said welding electrodes, a hydraulic backing cylinder slidably mounted on said internal guide, a backing piston extended from said backing cylinder toward said external guide, a pair of backing contacts mounted on the outer end of said piston, said contacts being interconnected and having the same spacing as said welding contacts, said backing contacts being positioned to be opposite said welding contacts on the other side of the wall of said member when said pistons are extended, means for extending said pistons to clamp the wall between the welding and backing electrodes, means for sliding said casing and said backing cylinder along said guides in opposing relationship, and means for rotating said internal guide to weld various portions of the circumference of said member.

12. A spot welding device comprising a support carrying a hydraulic cylinder, a piston actuated by hydraulic pressure slidable therein, a welding contact carried by said piston adapted to be applied to the material to be welded, and a valve carried by said piston and operated by contact with said material for varying the speed of movement of said piston.

13. A spot welding device comprising a support carrying a hydraulic cylinder, a piston actuated by hydraulic pressure slidable therein, a welding contact carried by said piston adapted to be applied to the material to be welded, and a valve carried by said piston having an operating rod extending through said piston ahead of said contacts to control the speed of said piston as it approaches said work.

14. A spot welding device comprising a support carrying a hydraulic cylinder, a piston actuated by hydraulic pressure slidable therein, a welding contact carried by said piston adapted to be applied to the material to be welded, said piston having a hollow body, and an exterior and interior face plate, said interior face plate having an aperture therein opening into said cylinder, a valve rod passing through a stuffing box in said exterior face plate and extending through said body and said aperture, the end of said valve rod being adapted to contact said material before contact of said welding contacts, a valve mounted on said rod above said aperture, a second valve mounted on said rod below said aperture, means resiliently causing the upper valve to close said aperture when the end of said valve rod is free from said material, the lower valve closing said aperture when said welding contacts approach said material, means for supplying fluid under pressure into said hollow body, and means for by-passing a portion of said fluid between said body and said cylinder.

15. A spot welding device comprising a support carrying a hydraulic cylinder, a piston actuated by hydraulic pressure slidable therein, a welding contact carried by said piston adapted to be applied to the material to be welded, said piston having a hollow body, an exterior and interior face plate, said interior face plate having an aperture therein opening into said cylinder, a valve rod passing through a stuffing box in said exterior face plate and extending through said body and said aperture, the end of said valve rod being adapted to contact said material before contact of said welding contacts, a valve mounted on said rod above said aperture, a second valve mounted on said rod below said aperture, means resiliently causing the upper valve to close said aperture when the end of said valve rod is free from said material, the lower valve closing said aperture when said welding contacts approach said material, means for adjusting the distance between said valves, means for supplying fluid under pressure into said hollow body, and means for by-passing a portion of said fluid between said body and said cylinder.

16. A spot welding device comprising a support carrying a hydraulic cylinder, a piston actuated by hydraulic pressure slidable therein, a welding contact carried by said piston adapted to be applied to the material to be welded, said piston having a hollow body, an exterior and interior face plate, said interior face plate having an aperture therein opening into said cylinder, a valve rod passing through a stuffing box in said exterior face plate and extending through said body and said aperture, the end of said valve rod being adapted to contact said material before contact of said welding contacts, a valve mounted on said rod above said aperture, a second valve mounted on said rod below said aperture, means resiliently causing the upper valve to close said aperture when the end of said valve rod is free from said material, the lower valve closing said aperture when said welding contacts approach said material, means for regulating the stroke of said piston, means for supplying fluid under pressure into said hollow body, and means for by-passing a portion of said fluid between said body and said cylinder.

17. A spot welding device comprising a support carrying a hydraulic cylinder, a piston actuated by hydraulic pressure slidable therein, a welding contact carried by said piston adapted to be applied to the material to be welded, said piston having a hollow body, an exterior and interior face plate, said interior face plate having an aperture therein opening into said cylinder, a valve rod passing through a stuffing box in said exterior face plate and extending through said body and said aperture, the end of said valve rod being adapted to contact said material before contact of said welding contacts, a valve mounted on said rod above said aperture, a second valve mounted on said rod below said aperture, means resiliently causing the upper valve to close said aperture when the end of said valve rod is free from said material, the lower valve closing said aperture when said welding contacts approach said material, means for setting and maintaining said cylinder at varying distances from the material to be welded, means for supplying fluid under pressure into said hollow body, and means for by-passing a portion of said fluid between said body and said cylinder.

18. A spot welding device comprising a support carrying a hydraulic cylinder, a piston actuated by hydraulic pressure slidable therein, a welding contact carried by said piston adapted to be applied to the material to be welded, said piston having a hollow body, an exterior and interior face plate, said interior face plate having an aperture therein opening into said cylinder, a valve rod passing through a stuffing box in said exterior face plate and extending through said body and said aperture, the end of said valve rod being adapted to contact said material before contact of said welding contacts, a valve mounted on said rod above said aperture, a second valve mounted on said rod below said aperture, means resiliently causing the upper valve to close said aperture when the end of said valve rod is free from said material, the lower valve closing said aperture when said welding contacts approach said material, means for setting and maintaining said piston in varying degrees of rotation, means for supplying fluid under pressure into said hollow body, and means for by-passing a portion of said fluid between said body and said cylinder.

19. A device for welding hollow members comprising an internal guide adapted to pass through said member, an external guide adjacent to said internal guide, a pair of welding electrodes slidably mounted on said external guide, a pair of backing electrodes slidably mounted on said internal guide, means for extending said pairs of electrodes toward each other to clamp the wall of said member therebetween, and means for energizing said electrodes.

20. A device for welding hollow members comprising an internal guide adapted to pass through said member, an external guide adjacent to said internal guide, a pair of welding electrodes slidably mounted on said external guide, a pair of backing electrodes slidably mounted on said internal guide, means for extending said pairs of electrodes toward each other to clamp the wall of said member therebetween, and means for interconnecting said welding and backing electrodes to maintain their opposing relationship when slid along said guides.

21. A device for welding hollow members comprising an internal guide adapted to pass through said member, an external guide adjacent to said internal guide and exterior of said member, a pair of welding electrodes slidably mounted on said external guide, a pair of backing electrodes slidably mounted on said internal guide, means for extending said pairs of electrodes toward each other to clamp the wall of said member therebetween, and means for rotating said external guide around said hollow member with said internal guide as the axis of rotation.

BRUCE BURNS.